(12) United States Patent
Ren et al.

(10) Patent No.: US 12,477,370 B2
(45) Date of Patent: Nov. 18, 2025

(54) RTT-BASED POSITIONING WITH CLI MEASUREMENT

(71) Applicant: QUALCOMM Incorporated, San Diego, CA (US)

(72) Inventors: Yuwei Ren, Beijing (CN); Weimin Duan, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 18/006,556

(22) PCT Filed: Aug. 28, 2020

(86) PCT No.: PCT/CN2020/112157
§ 371 (c)(1),
(2) Date: Jan. 23, 2023

(87) PCT Pub. No.: WO2022/041130
PCT Pub. Date: Mar. 3, 2022

(65) Prior Publication Data
US 2023/0300653 A1 Sep. 21, 2023

(51) Int. Cl.
*H04W 24/10* (2009.01)
*H04B 17/336* (2015.01)
*H04W 72/231* (2023.01)

(52) U.S. Cl.
CPC .......... *H04W 24/10* (2013.01); *H04B 17/336* (2015.01); *H04W 72/231* (2023.01)

(58) Field of Classification Search
CPC .. H04W 24/10; H04W 72/231; H04B 17/336; G01S 5/0205; G01S 5/0072; G01S 5/14;
(Continued)

(56) References Cited

U.S. PATENT DOCUMENTS 10,375,669 B2  8/2019  Edge
10,903,920 B2  1/2021  Azarian Yazdi et al.
(Continued)

FOREIGN PATENT DOCUMENTS

CN  110392990 A  10/2019
CN  110752900 A  2/2020
(Continued)

OTHER PUBLICATIONS

Cewit et al., "Discussion on Positioning Enhancements for Release 17", 3GPP TSG RAN WG1 102-e, R1-2006621, Aug. 8, 2020 (Aug. 8, 2020), 7 Pages, sections 2, 5.
(Continued)

*Primary Examiner* — Brian T O Connor
(74) *Attorney, Agent, or Firm* — Thien T. Nguyen

(57) ABSTRACT

An apparatus comprises: an interface; a memory; and a processor, communicatively coupled to the interface and the memory, configured to: instruct a node to send a first cellular reference signal to a target UE (user equipment) and to another UE, the node being a cellular-communication node; instruct, via the interface, the target UE to report to the node a first time difference, the first time difference being a first time amount between receipt of the first cellular reference signal by the target UE and transmission of a second cellular reference signal by the target UE; and instruct, via the interface, the other UE to report a second time difference, the second time difference being a second time amount between receipt of the first cellular reference signal by the other UE and receipt of the second cellular reference signal, in a cross-link interference resource, by the other UE.

27 Claims, 12 Drawing Sheets

(58) Field of Classification Search
CPC .... G01S 13/765; G01S 5/0215; G01S 5/0236; G01S 13/878
See application file for complete search history.

(56) References Cited

U.S. PATENT DOCUMENTS

| | | | | |
|---|---|---|---|---|
| 11,943,797 B2* | 3/2024 | Li | ............. | H04L 5/0092 |
| 11,985,619 B2* | 5/2024 | Ying | ............. | H04W 24/10 |
| 12,028,122 B2* | 7/2024 | Miao | ............. | H04W 8/005 |
| 12,035,345 B2* | 7/2024 | Ying | ............. | H04W 72/1273 |
| 12,075,272 B2* | 8/2024 | Xu | ............. | H04L 5/0051 |
| 12,082,228 B2* | 9/2024 | Ying | ............. | H04B 17/318 |
| 12,206,625 B2* | 1/2025 | Qian | ............. | H04B 17/318 |
| 2020/0154240 A1 | 5/2020 | Edge et al. | | |
| 2020/0266908 A1* | 8/2020 | Qian | ............. | H04L 5/0007 |
| 2020/0267738 A1 | 8/2020 | Barbu et al. | | |
| 2022/0103270 A1* | 3/2022 | Miao | ............. | H04L 5/0048 |
| 2023/0189315 A1* | 6/2023 | Haustein | ............. | H04W 24/02 370/252 |
| 2023/0413088 A1* | 12/2023 | Sedin | ............. | H04W 24/10 |
| 2024/0284345 A1* | 8/2024 | Ying | ............. | H04L 5/0073 |

FOREIGN PATENT DOCUMENTS

| | | |
|---|---|---|
| CN | 111356075 A | 6/2020 |
| CN | 111565401 A | 8/2020 |
| WO | 2018204098 | 11/2018 |
| WO | 2019027539 | 2/2019 |
| WO | 2019029353 A1 | 2/2019 |
| WO | 2020163392 A1 | 8/2020 |

OTHER PUBLICATIONS

Huawei et al., "NR Positioning Measurements", 3GPP TSG RAN WG1 #97, R1-1906054, May 17, 2019 (May 17, 2019), 15 Pages, the whole document.
International Search Report and Written Opinion—PCT/CN2020/112157—ISA/EPO—May 27, 2021.

* cited by examiner

RTT-BASED POSITIONING WITH CLI MEASUREMENT

CROSS-REFERENCE TO RELATED APPLICATION

This application is the National Stage of International Application No. PCT/CN2020/112157, filed Aug. 28, 2020, entitled "RTT-BASED POSITIONING WITH CLI MEASUREMENT," which is assigned to the assignee hereof, and the entire contents of which is hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example apparatus includes: an interface; a memory; and a processor, communicatively coupled to the interface and the memory, configured to: instruct a node to send a first cellular reference signal to a target UE (user equipment) and to another UE, the node being a cellular-communication node; instruct, via the interface, the target UE to report to the node a first time difference, the first time difference being a first time amount between receipt of the first cellular reference signal by the target UE and transmission of a second cellular reference signal by the target UE; and instruct, via the interface, the other UE to report a second time difference, the second time difference being a second time amount between receipt of the first cellular reference signal by the other UE and receipt of the second cellular reference signal, in a cross-link interference resource, by the other UE.

Implementations of such an apparatus may include one or more of the following features. To instruct the other UE to report the second time difference, the processor is configured to instruct the node to send a cross-link interference resource configuration, including an instruction to report the second time difference, to the other UE. To instruct the target UE to report the first time difference, the processor is configured to instruct the node to send the cross-link interference resource configuration to the target UE. To instruct the target UE to report the first time difference, the processor is configured to instruct the node to send a reporting instruction to the target UE for the target UE to report the first time difference. The reporting instruction is part of at least one of a downlink control information (DCI) signal, a medium access control-control element (MAC-CE) signal, or a radio resource control (RRC) signal.

Also or alternatively, implementations of such an apparatus may include one or more of the following features. The first cellular reference signal comprises one of a downlink reference signal (DL-RS) or a sidelink reference signal (SL-RS). The processor is configured to instruct, using the interface, the target UE to send the second cellular reference signal overlapping in time with the first cellular reference signal. The apparatus includes the node. The processor is configured to: send the first cellular reference signal via the interface; receive the second cellular reference signal via the interface; determine a first distance between the node and the target UE based on a transmission time of first cellular reference signal from the node, a first reception time at the node of the second cellular reference signal, and the first time difference; determine a second distance between the node and the other UE; determine a third distance between the other UE and the target UE based on the first time difference, the second time difference, the second distance between the node and the other UE, and the first distance between the node and the target UE; and determine a first location of the target UE based on the third distance between the other UE and the target UE and a second location of the other UE.

Another example apparatus includes: means for instructing a node to send a first cellular reference signal to a target UE (user equipment) and to another UE, the node being a cellular-communication node; means for instructing the target UE to report to the node a first time difference, the first time difference being a first time amount between receipt of the first cellular reference signal by the target UE and transmission of a second cellular reference signal by the target UE; and means for instructing the other UE to report a second time difference, the second time difference being a second time amount between receipt of the first cellular reference signal by the other UE and receipt of the second cellular reference signal, in a cross-link interference resource, by the other UE.

Implementations of such an apparatus may include one or more of the following features. The means for instructing the other UE to report the second time difference include means for instructing the node to send a cross-link interference resource configuration, including an instruction to report the second time difference, to the other UE. The means for instructing the target UE to report the first time difference include means for instructing the node to send the cross-link interference resource configuration to the target UE. The means for instructing the target UE to report the first time difference include means for instructing the node to send a reporting instruction to the target UE for the target UE to report the first time difference. The reporting instruction is part of at least one of a downlink control information (DCI) signal, a medium access control-control element (MAC-CE) signal, or a radio resource control (RRC) signal.

Also or alternatively, implementations of such an apparatus may include one or more of the following features. The first cellular reference signal comprises one of a downlink reference signal (DL-RS) or a sidelink reference signal (SL-RS). The apparatus includes means for instructing the target UE to send the second cellular reference signal overlapping in time with the first cellular reference signal. The apparatus includes the node. The apparatus includes: means for sending the first cellular reference signal; means for receiving the second cellular reference signal; means for determining a first distance between the node and the target UE based on a transmission time of first cellular reference signal from the node, a first reception time at the node of the second cellular reference signal, and the first time difference; means for determining a second distance between the node and the other UE; means for determining a third distance between the other UE and the target UE based on the first time difference, the second time difference, the second distance between the node and the other UE, and the first distance between the node and the target UE; and means for determining a first location of the target UE based on the third distance between the other UE and the target UE and a second location of the other UE.

An example method of facilitating position information determination includes: instructing a node to send a first cellular reference signal to a target UE (user equipment) and to another UE, the node being a cellular-communication node; instructing the target UE to report to the node a first time difference, the first time difference being a first time amount between receipt of the first cellular reference signal by the target UE and transmission of a second cellular reference signal by the target UE; and instructing the other UE to report a second time difference, the second time difference being a second time amount between receipt of the first cellular reference signal by the other UE and receipt of the second cellular reference signal, in a cross-link interference resource, by the other UE.

Implementations of such a method may include one or more of the following features. Instructing the other UE to report the second time difference includes instructing the node to send a cross-link interference resource configuration, including an instruction to report the second time difference, to the other UE. Instructing the target UE to report the first time difference includes instructing the node to send the cross-link interference resource configuration to the target UE. Instructing the target UE to report the first time difference includes instructing the node to send a reporting instruction to the target UE for the target UE to report the first time difference. The reporting instruction is part of at least one of a downlink control information (DCI) signal, a medium access control-control element (MAC-CE) signal, or a radio resource control (RRC) signal.

Also or alternatively, implementations of such a method may include one or more of the following features. The first cellular reference signal comprises one of a downlink reference signal (DL-RS) or a sidelink reference signal (SL-RS). The method includes instructing the target UE to send the second cellular reference signal overlapping in time with the first cellular reference signal. The method includes: determining a first distance between the node and the target UE based on a transmission time of first cellular reference signal from the node, a first reception time at the node of the second cellular reference signal, and the first time difference; determining a second distance between the node and the other UE; determining a third distance between the other UE and the target UE based on the first time difference, the second time difference, the second distance between the node and the other UE, and the first distance between the node and the target UE; and determining a first location of the target UE based on the third distance between the other UE and the target UE and a second location of the other UE.

An example non-transitory, processor-readable storage medium includes processor-readable instructions configured to cause a processor, in order to facilitate position information determination, to: instruct a node to send a first cellular reference signal to a target UE (user equipment) and to another UE, the node being a cellular-communication node; instruct the target UE to report to the node a first time difference, the first time difference being a first time amount between receipt of the first cellular reference signal by the target UE and transmission of a second cellular reference signal by the target UE; and instruct the other UE to report a second time difference, the second time difference being a second time amount between receipt of the first cellular reference signal by the other UE and receipt of the second cellular reference signal, in a cross-link interference resource, by the other UE.

Implementations of such a storage medium may include one or more of the following features. The instructions configured to cause the processor to instruct the other UE to report the second time difference include instructions configured to cause the processor to instruct the node to send a cross-link interference resource configuration, including an instruction to report the second time difference, to the other UE. The instructions configured to cause the processor to instruct the target UE to report the first time difference include instructions configured to cause the processor to instruct the node to send the cross-link interference resource configuration to the target UE. The instructions configured to cause the processor to instruct the target UE to report the first time difference include instructions configured to cause the processor to instruct the node to send a reporting instruction to the target UE for the target UE to report the first time difference. The reporting instruction is part of at least one of a downlink control information (DCI) signal, a medium access control-control element (MAC-CE) signal, or a radio resource control (RRC) signal.

Also or alternatively, implementations of such a storage medium may include one or more of the following features. The first cellular reference signal comprises one of a downlink reference signal (DL-RS) or a sidelink reference signal (SL-RS). The storage medium includes instructions configured to cause the processor to instruct the target UE to send the second cellular reference signal overlapping in time with the first cellular reference signal. The storage medium includes instructions configured to cause the processor to: determine a first distance between the node and the target UE based on a transmission time of first cellular reference signal from the node, a first reception time at the node of the second cellular reference signal, and the first time difference; determine a second distance between the node and the other UE; determine a third distance between the other UE and the target UE based on the first time difference, the second time difference, the second distance between the node and the other UE, and the first distance between the node and the target UE; and determine a first location of the target UE based on the third distance between the other UE and the target UE and a second location of the other UE.

An example target UE includes: an interface; a memory; and a processor, communicatively coupled to the interface and the memory, configured to: receive, via the interface, a first cellular reference signal from a node; send, via the interface, a second cellular reference signal in a cross-link interference resource; determine a first time difference, the first time difference being a first time amount between receipt of the first cellular reference signal by the target UE and transmission of the second cellular reference signal by the target UE; receive, via the interface, a second time difference, the second time difference being a second time amount between receipt of the first cellular reference signal by the other UE and receipt of the second cellular reference signal by the other UE; and determine a first distance between the target UE and the other UE based on the first time difference and the second time difference.

Implementations of such a target UE may include one or more of the following features. The processor is configured to: receive, via the interface, a third time difference, the third time difference being a third time amount between transmission of the first cellular reference signal by the node and reception of the second cellular reference signal by the node; determine a first distance between the node and the target UE based on the first time difference and the third time difference; obtain a second distance between the node and the other UE; determine a third distance between the other UE and the target UE based on the first time difference, the second time difference, the second distance between the node and the other UE, and the first distance between the node and the target UE; and determine a first location of the target UE based on the third distance between the other UE and the target UE and a second location of the other UE. The processor is configured to determine the second distance based on the second location of the other UE. The second cellular reference signal comprises a sidelink reference signal (SL-RS).

Another example target UE includes: means for receiving a first cellular reference signal from a node; means for sending a second cellular reference signal in a cross-link interference resource; means for determining a first time difference, the first time difference being a first time amount between receipt of the first cellular reference signal by the target UE and transmission of the second cellular reference signal by the target UE; means for receiving a second time difference, the second time difference being a second time amount between receipt of the first cellular reference signal by the other UE and receipt of the second cellular reference signal by the other UE; and means for determining a first distance between the target UE and the other UE based on the first time difference and the second time difference.

Implementations of such a target UE may include one or more of the following features. The target UE includes: means for receiving a third time difference, the third time difference being a third time amount between transmission of the first cellular reference signal by the node and reception of the second cellular reference signal by the node; means for determining a first distance between the node and the target UE based on the first time difference and the third time difference; means for obtaining a second distance between the node and the other UE; means for determining a third distance between the other UE and the target UE based on the first time difference, the second time difference, the second distance between the node and the other UE, and the first distance between the node and the target UE; and means for determining a first location of the target UE based on the third distance between the other UE and the target UE and a second location of the other UE. The target UE includes means for determining the second distance based on the second location of the other UE. The second cellular reference signal comprises a sidelink reference signal (SL-RS).

An example method of facilitating determination of a location of a target UE includes: receiving, at the target UE, a first cellular reference signal from a node; sending, from the target UE, a second cellular reference signal in a cross-link interference resource; determining, at the target UE, a first time difference, the first time difference being a first time amount between receipt of the first cellular reference signal by the target UE and transmission of the second cellular reference signal by the target UE; receiving, at the target UE, a second time difference, the second time difference being a second time amount between receipt of the first cellular reference signal by the other UE and receipt of the second cellular reference signal by the other UE; and determining, at the target UE, a first distance between the target UE and the other UE based on the first time difference and the second time difference.

Implementations of such a method may include one or more of the following features. The method includes: receiving, at the target UE, a third time difference, the third time difference being a third time amount between transmission of the first cellular reference signal by the node and reception of the second cellular reference signal by the node; determining, at the target UE, a first distance between the node and the target UE based on the first time difference and the third time difference; obtaining, at the target UE, a second distance between the node and the other UE; determining, at the target UE, a third distance between the other UE and the target UE based on the first time difference, the second time difference, the second distance between the node and the other UE, and the first distance between the node and the target UE; and determining, at the target UE, a first location of the target UE based on the third distance between the other UE and the target UE and a second location of the other UE. The method includes determining, at the target UE, the second distance based on the second location of the other UE. The second cellular reference signal comprises a sidelink reference signal (SL-RS).

An example non-transitory, processor-readable storage medium includes processor-readable instructions configured to cause a processor of a target UE, in order to facilitate determination of a location of the target UE, to: receive a first cellular reference signal from a node; send a second cellular reference signal in a cross-link interference resource; determine a first time difference, the first time difference being a first time amount between receipt of the first cellular reference signal by the target UE and transmission of the second cellular reference signal by the target UE; receive a second time difference, the second time difference being a second time amount between receipt of the first cellular reference signal by the other UE and receipt of the second cellular reference signal by the other UE; and determine a first distance between the target UE and the other UE based on the first time difference and the second time difference.

Implementations of such a storage medium may include one or more of the following features. The instructions include instructions configured to cause the processor to: receive a third time difference, the third time difference being a third time amount between transmission of the first cellular reference signal by the node and reception of the second cellular reference signal by the node; determine a first distance between the node and the target UE based on the first time difference and the third time difference; obtain a second distance between the node and the other UE; determine a third distance between the other UE and the target UE based on the first time difference, the second time difference, the second distance between the node and the other UE, and the first distance between the node and the target UE; and determine a first location of the target UE based on the third distance between the other UE and the target UE and a second location of the other UE. The instructions include instructions configured to cause the processor to determine the second distance based on the second location of the other UE. The second cellular reference signal comprises a sidelink reference signal (SL-RS).

DETAILED DESCRIPTION

Figure 1:
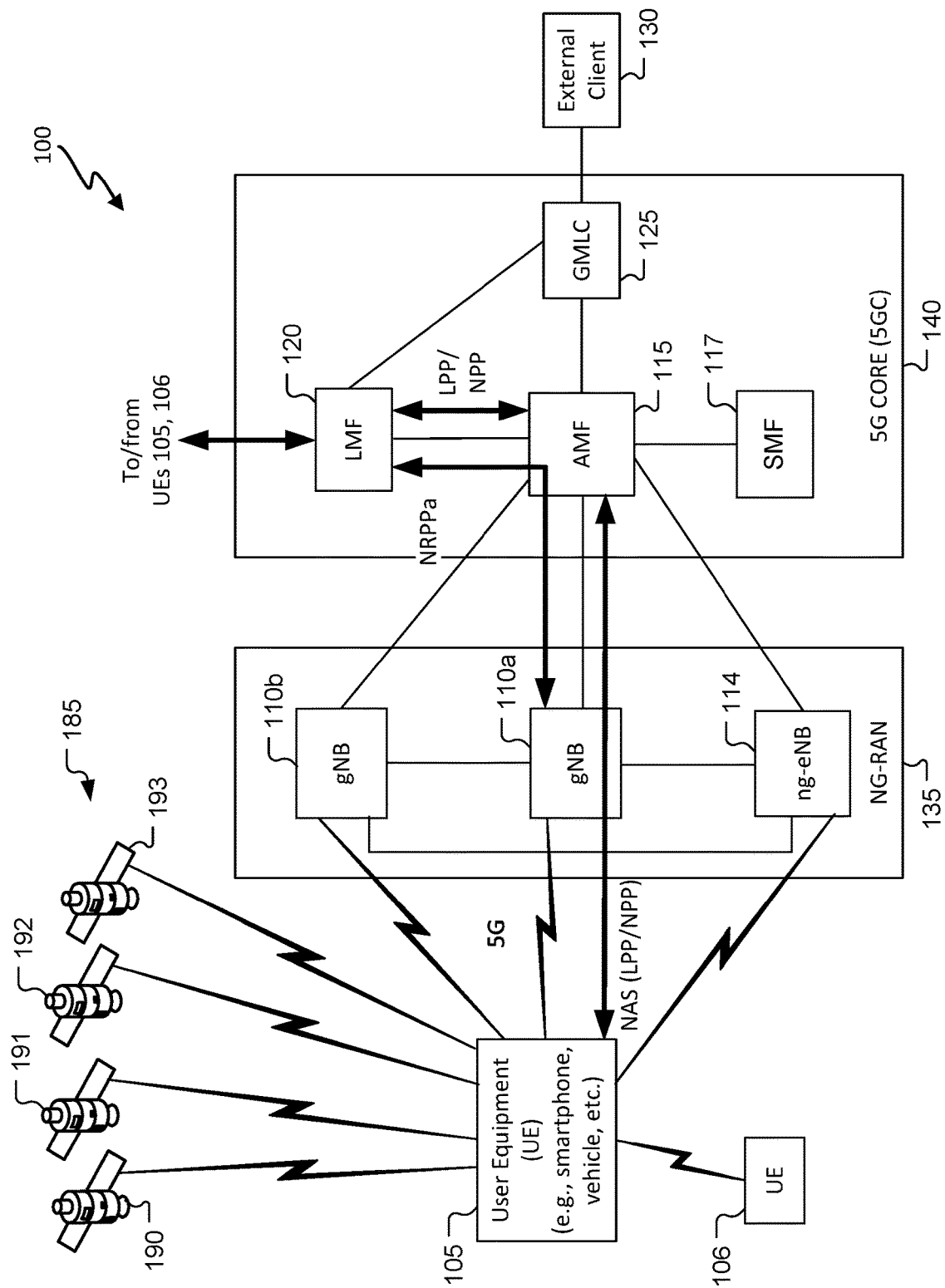
FIG. 1 is a simplified diagram of an example wireless communications system.

Techniques are discussed herein for round-trip-time positioning based on cross-link interference (CLI) measurement. A CLI resource configuration may be provided to a recipient user equipment (UE) that is scheduled to receive an uplink signal from a target UE (for which a location is desired to be determined) concurrently with a downlink signal from a node, with the recipient UE thus being a recipient of interference from the target UE. The CLI resource configuration may be configured to cause the recipient UE to report a time difference between receipt of a reference signal from the node and receipt of the uplink signal from the target UE. The target UE may also be provided with the CLI resource configuration and/or other signaling such that the target UE will report a time difference between receipt of the reference signal from the node and transmission of the uplink signal from the target UE. These time differences, along with other information (e.g., distance from the node to the target UE, distance from the node to the recipient UE) may be used to determine a distance between the target UE and the recipient UE. The distance between the target UE and the recipient UE may be used to determine a location of the target UE. Other examples, however, may be implemented.

Items and/or techniques described herein may provide one or more of the following capabilities, as well as other capabilities not mentioned. A signal causing cross-link interference at a recipient UE may be used to help determine a location of a target UE sending the signal even if the interference is non-reciprocal between the target UE and the recipient UE. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections)

directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications.

In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-U IRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and provides QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
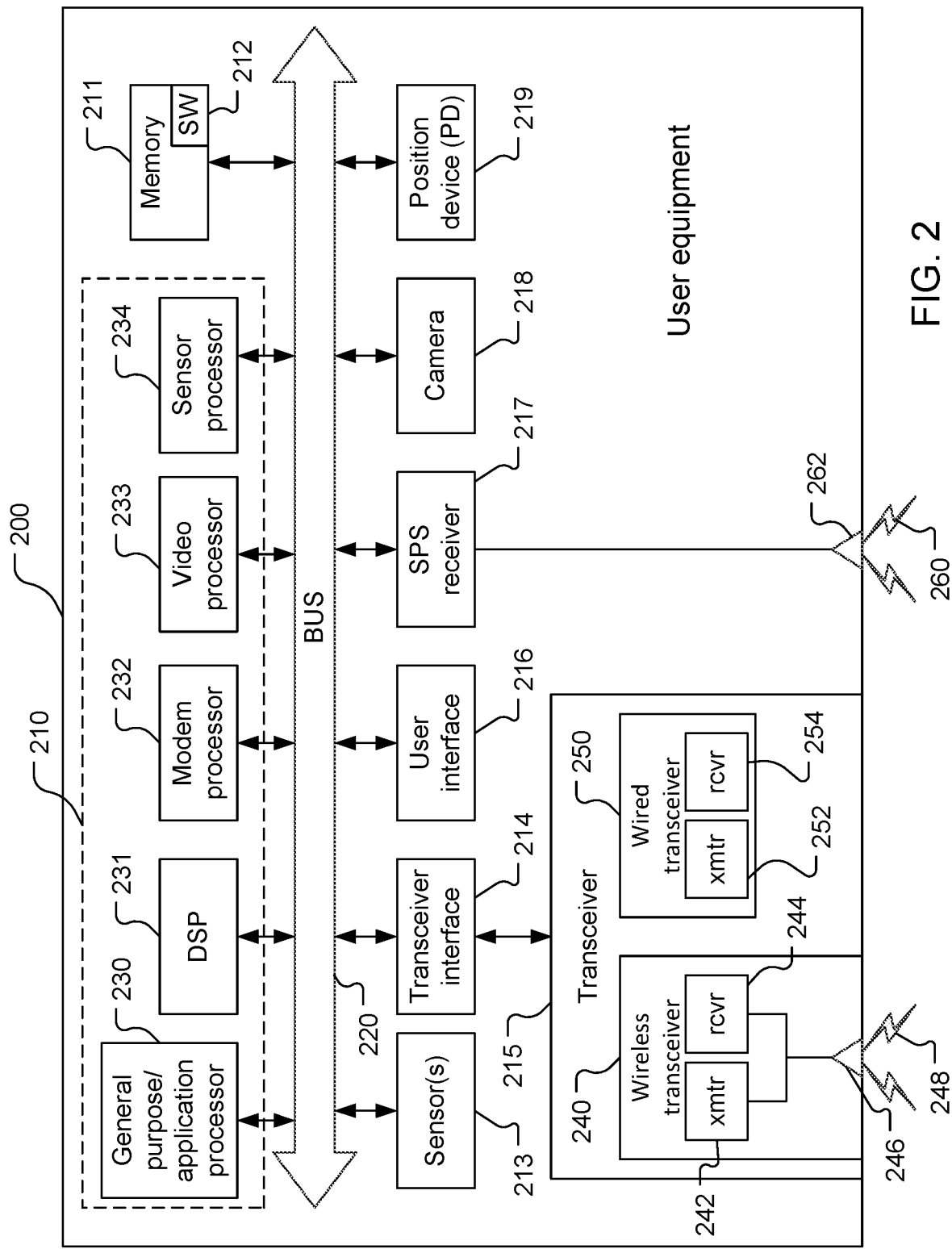
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions.

The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the network 135. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
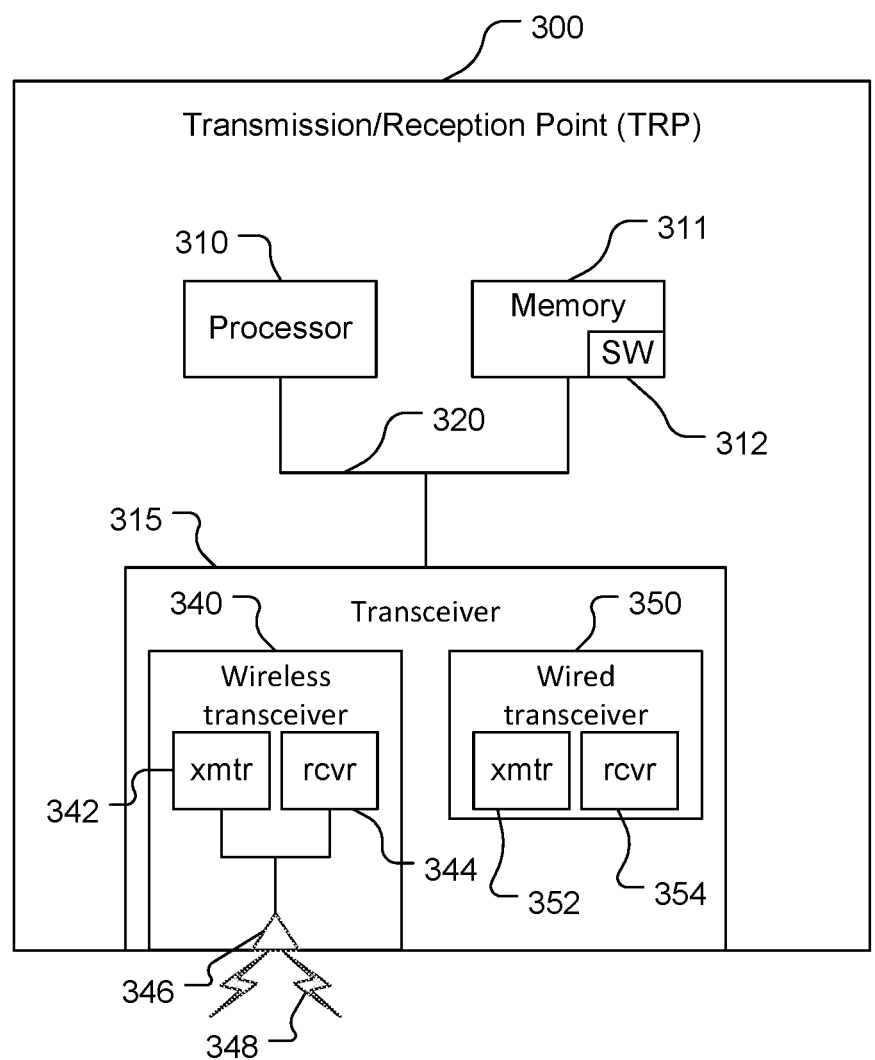
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 135 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
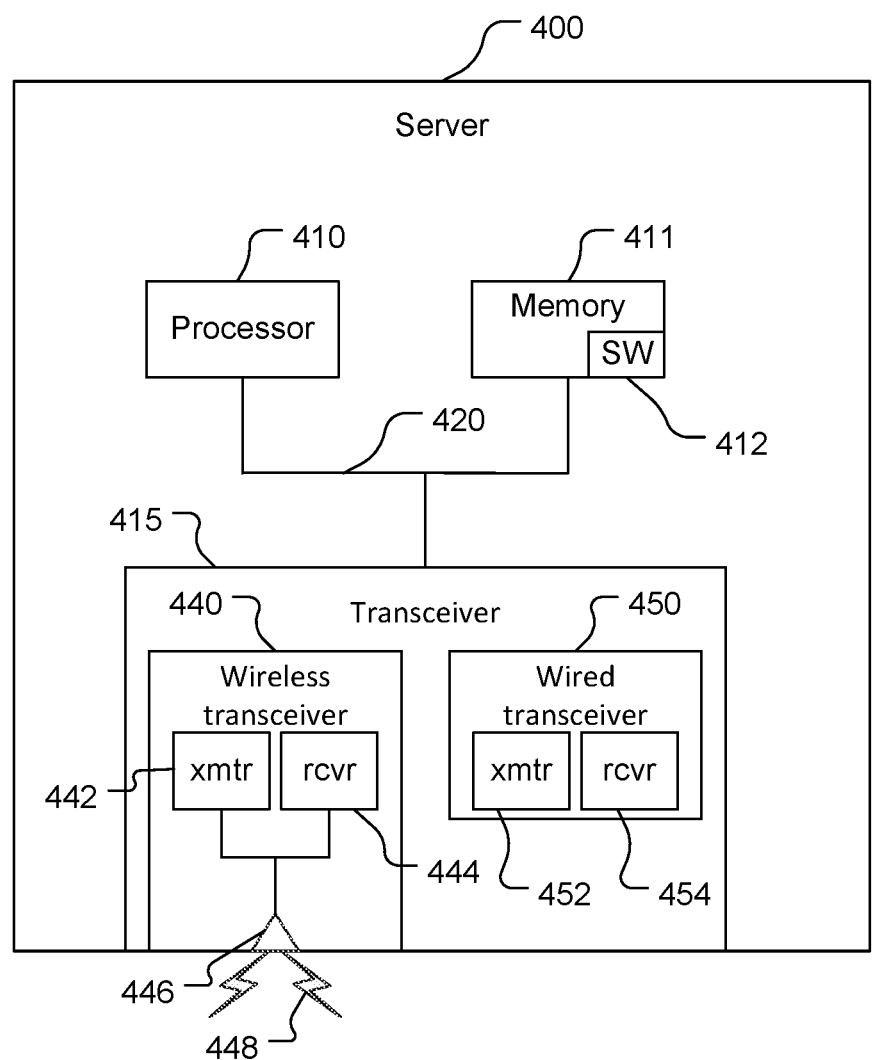
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. In an OFDM symbol, a PRS resource occupies consecutive PRBs. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

Figure 5:
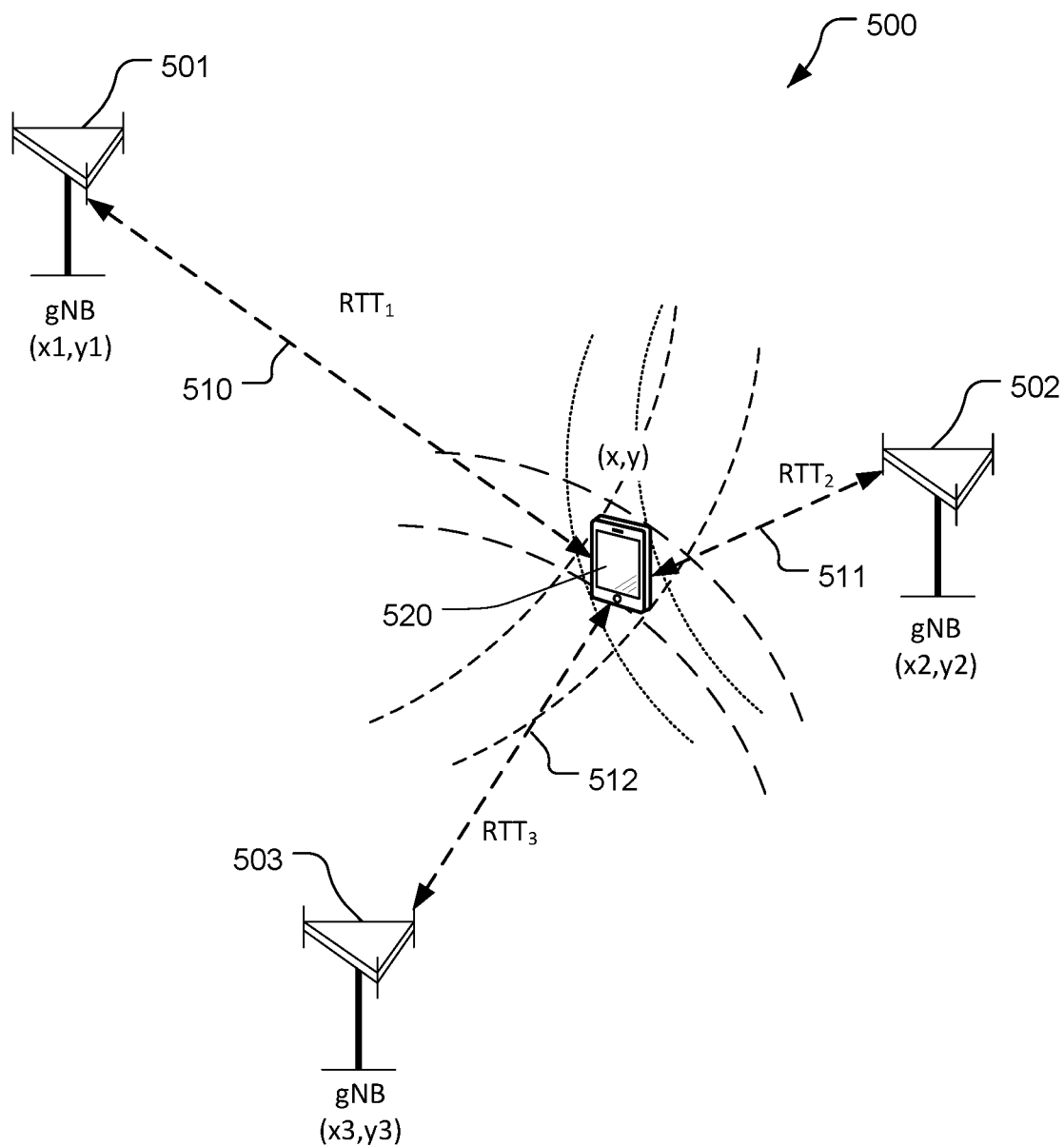
FIG. 5 is a wireless communications system for multi-RTT-based position determination.

Referring to FIG. 5, an example wireless communications system 500 for multi-RTT-based position determination includes a UE 520 (which may correspond to any of the UEs described herein) and base stations 501, 502, 503. The UE 520 may be configured to calculate an position estimate of the UE 520, and/or to assist another entity (e.g., a base station or core network component, another UE, a location server, a third party application, etc.) to calculate the position estimate of the UE 520. The UE 520 may be configured to communicate wirelessly with the base stations 501, 502, 503 (which may correspond to any of the base stations described herein) using RF signals and standardized protocols for the modulation of the RF signals and the exchange of information packets.

To determine the position (x, y) of the UE 520, the entity determining the position of the UE 520 may use the locations of the base stations 501-503, which may be represented in a reference coordinate system as $(x_k, y_k)$, where k=1, 2, 3 in the example of FIG. 5. Where one of the base stations 502 (e.g., the serving base station) or the UE 520 determines the position of the UE 520, the locations of the involved base stations 501, 503 may be provided to the serving base station 502 or the UE 520 by a location server with knowledge of the network geometry (e.g., the LMF 120). Alternatively, the location server may determine the position of the UE 520 using the known network geometry.

Either the UE 520 or the respective base station 501-503 may determine distances $d_k$ (where k=1, 2, 3) between the UE 520 and the respective base stations 501-503. Determining an RTT 510, 511, 512 of signals exchanged between the UE 520 and a respective one of the base stations 501-503 may be performed and the RTT converted to the distance $d_k$. RTT techniques can measure the time between sending a signaling message (e.g., a reference RF signal) and receiving a response. For example, referring to FIG. 6, a gNB 610 may transmit a reference signal (RS) 612 at a time $t_a$, with the RS 612 being received by a UE 620 at a time $t_b$. The UE 620 may send and RTT response 624 at a time $t_c$, with the RTT response 624 being received by the gNB 610 at a time $t_d$. A time T equal to the time difference $(t_d-t_a)$ minus the time difference $(t_c-t_b)$ corresponds to twice the propagation time between the gNB 610 and the UE 620 and thus the distance between the gNB 610 and the UE 620 may be found by T/2c where c is the speed of light. These methods may utilize calibration to remove/reduce processing and/or hardware delays. The processing delays for the UE 520 and the base stations 501-503 may, in some environments, be assumed to be the same, but may not be accurate.

The distances $d_k$ may be used by the UE 520, a base station 501-503, and/or the location server to solve for the position (x, y) of the UE 520 by using a variety of known geometric techniques, such as, for example, trilateration. From FIG. 6, it can be seen that the position of the UE 520 ideally lies at the common intersection of three semicircles, each semicircle being defined by radius $d_k$ and center $(x_k, y_k)$, where k=1, 2, 3.

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Cross-Link Interference

Figure 7:
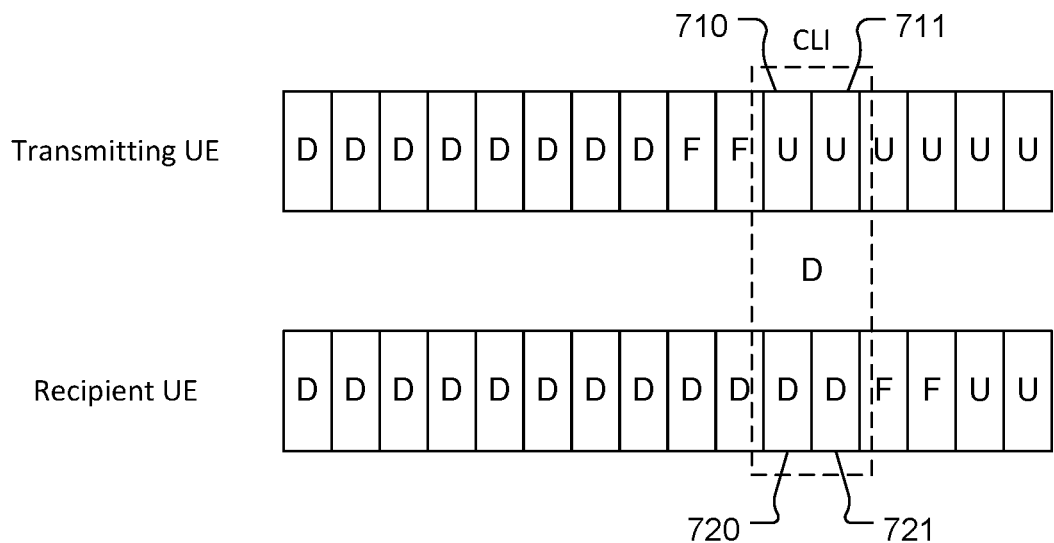
FIG. 7 is a timing diagram showing possible cross-link interference.

Cross-link interference (CLI) is a UE-to-UE interference between a transmitting UE and a recipient UE. In a time-domain-duplex (TDD) system, nearby UEs have different UL-DL (uplink-downlink) slot formats. When a recipient UE (also called a victim UE) receives a transmission from the transmitting UE (also called an aggressor UE) within a UL symbol (i.e., an interfering symbol) of the transmitting UE that collides with a DL symbol of the recipient UE, this is known as CLI. For example, referring to FIG. 7, uplink transmissions 710, 711 from a transmitting UE overlap, and may interfere, with reception of downlink symbols 720, 721 by a recipient UE. The CLI is caused the by the UL transmission from the transmitting UE, such as a PUCCH (Physical Uplink Control CHannel), PUSCH (Physical Uplink Shared CHannel), PRACH (Physical Random Access CHannel), or SRS (Sounding Reference Signal) transmission. The network, e.g., a server (e.g., an LMF) and/or a base station (e.g., a gNB) may configure CLI resources for interference management. The recipient UE may be configured to measure the signal in the resource causing the CLI without the transmitting UE being affected, e.g., without affecting the UL transmission that causes the CLI. For example, a measurement may be an SRS-RSRP, i.e., the received power of an SRS, or a CLI RSSI, i.e., the strength of the signal causing the CLI. The terms "recipient UE" and "transmitting UE" refer to the signaling regarding CLI and are not limiting of the UEs, e.g., the recipient UE may transmit signals and the transmitting UE may receive signals.

CLI measurements may be used for RTT-based positioning. Because RTT estimation is based on round-trip propagation, interference should be reciprocal for both signals involved in a round-trip propagation. Reciprocal interference, however, may not exist, e.g., due to beamforming by one or more UEs involved in the CLI.

Cross-Link Interference Signal Measurement for Positioning

Figure 8:
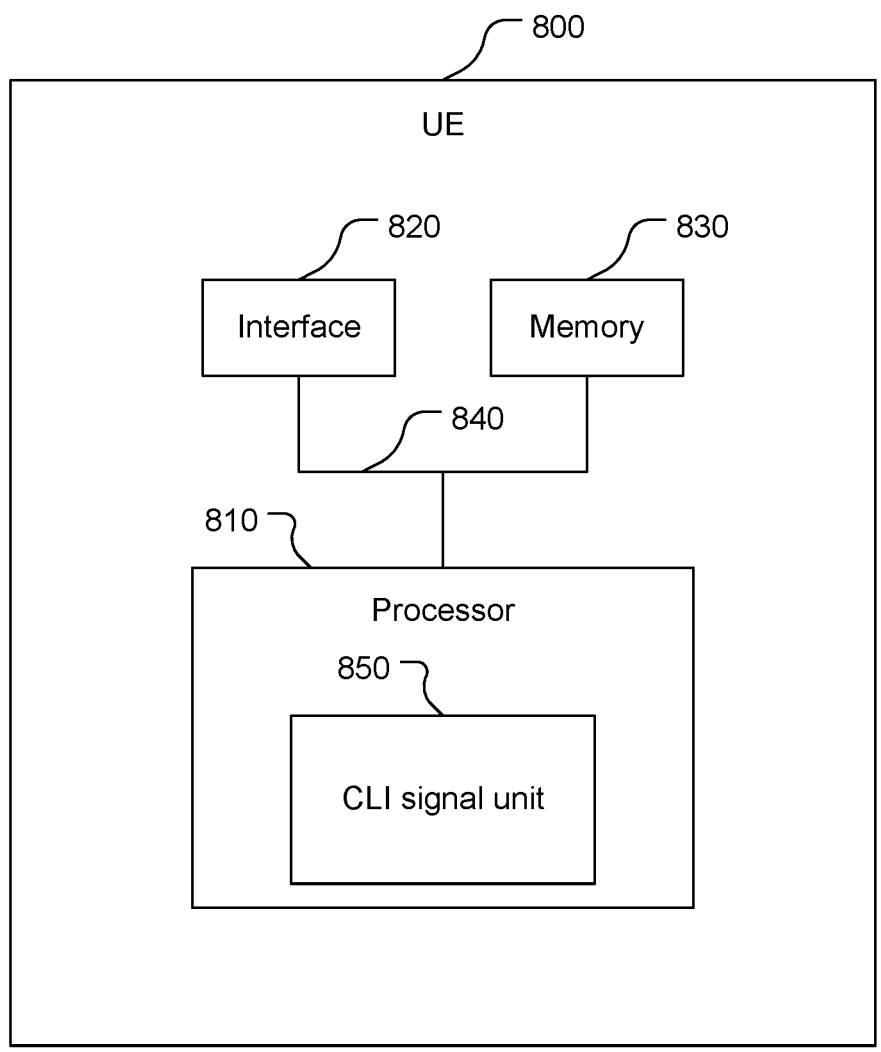
FIG. 8 is a simplified block diagram of an example of the user equipment shown in FIG. 2.

Referring to FIG. 8, with further reference to FIGS. 1-4, a UE 800, which is an example of the UE 200 shown in FIG. 2, includes a processor 810, an interface 820, and a memory 830 communicatively coupled to each other by a bus 840. The UE 800 may include some or all of the components shown in FIG. 8, and may include one or more other components such as any of those shown in FIG. 2. The processor 810 may include one or more components of the processor 210. The interface 820 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 820 may include the wired transmitter 252 and/or the wired receiver 254. The interface 820 may include the SPS receiver 217 and the antenna 262. The memory 830 may be configured similarly to the memory 211, e.g., including software with processor-readable instructions configured to cause the processor 810 to perform functions.

The description herein may refer only to the processor 810 performing a function, but this includes other implementations such as where the processor 810 executes software (stored in the memory 830) and/or firmware. The description herein may refer to the UE 800 performing a function as shorthand for one or more appropriate components (e.g., the processor 810 and the memory 830) of the UE 800 performing the function. The processor 810 (possibly in conjunction with the memory 830 and, as appropriate, the interface 820) includes a CLI signal unit 850. The CLI signal unit 850 is optional and may be configured to perform one or more functions for receiving and reporting a time of receipt of a signal potentially inducing CLI, e.g., an uplink signal from another UE received during receipt of a downlink signal from a node, e.g., a base station or yet another UE. Also or alternatively, the CLI signal unit 850 may be configured to report a time of transmission of a signal potentially inducing CLI, e.g., a uplink signal sent by the UE 800 that may collide with a downlink signal at another UE. The functionality of the CLI signal unit 850 is discussed further herein.

Figure 6:
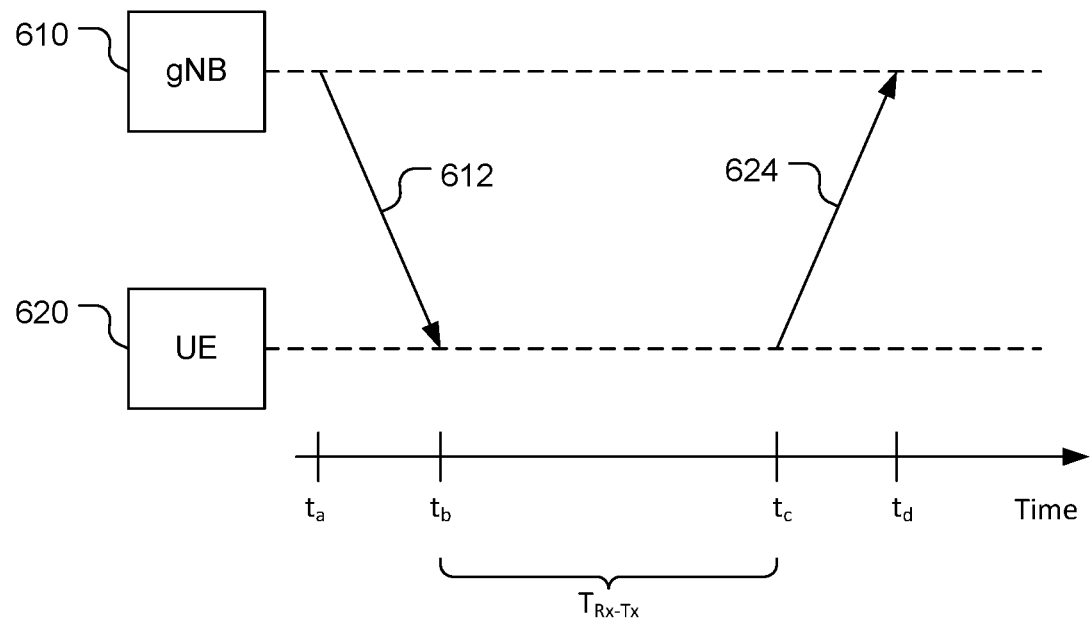
FIG. 6 is a timing diagram of RTT signal exchange.
Figure 9:
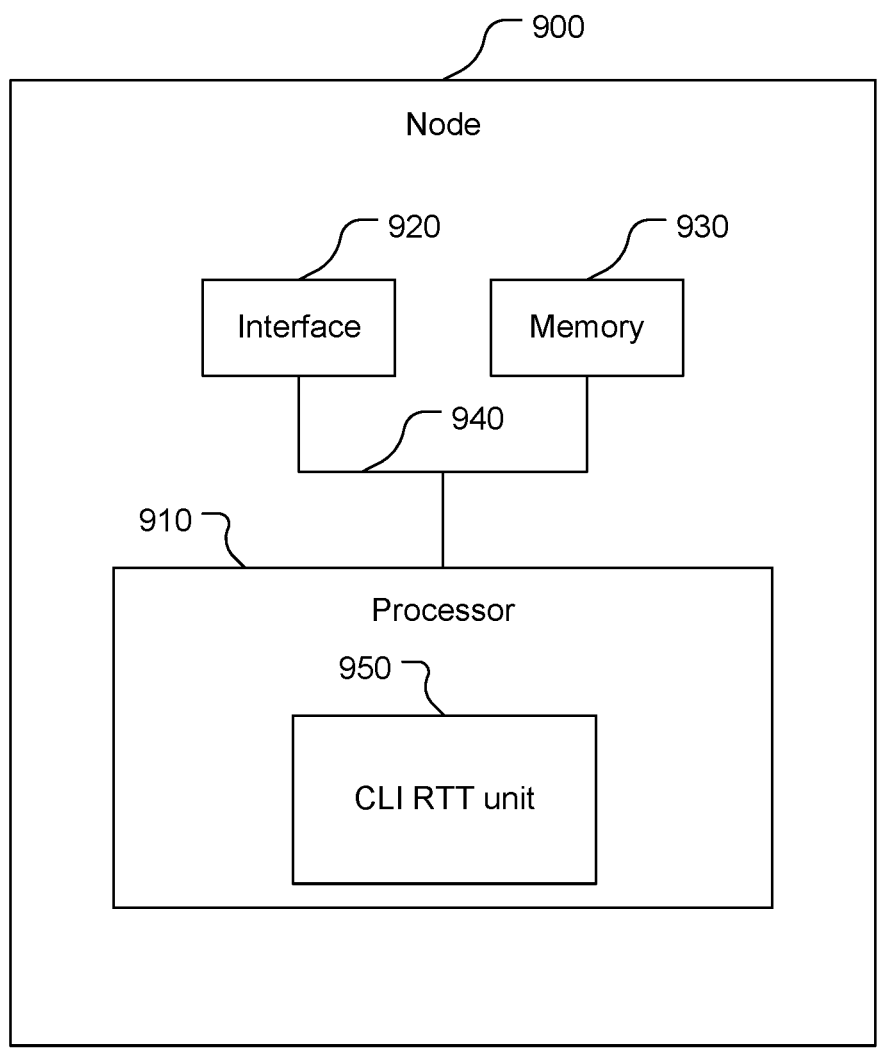
FIG. 9 is a simplified block diagram of an example of a node.

Referring to FIG. 6, with further reference to FIGS. 1-4 and 8, a node 900, which may be an example of the TRP 300 shown in FIG. 3, an example of the server 400 (e.g., an LMF) shown in FIG. 4, or an example of the UE 800, or a combination thereof, includes a processor 910, an interface 920, and a memory 930 communicatively coupled to each other by a bus 940. The node 900 may include some or all of the components shown in FIG. 9, and may include one or more other components such as any of those shown in FIG. 3, FIG. 4, and/or FIG. 8. The interface 920 may include one or more of the components of the transceiver 315 and/or the transceiver 415 (e.g., the wired transceiver 350, 450 and/or the wireless transceiver 340, 440) and/or the interface 820. The memory 930 may be configured similarly to the memory 311 and/or the memory 411 and/or the memory 830, e.g., including software with processor-readable instructions configured to cause the processor 910 to perform functions. The interface 920 may communicate via (send and/or receive) cellular signals such that the node 900 is a cellular-communication node.

The description herein may refer only to the processor 910 performing a function, but this includes other implementations such as where the processor 910 executes software (stored in the memory 930) and/or firmware. The description herein may refer to the node 900 performing a function as shorthand for one or more appropriate components (e.g., the processor 910 and the memory 930) of the node 900 performing the function. The processor 910 (possibly in conjunction with the memory 930 and, as appropriate, the interface 920) includes a CLI RTT unit 950. The CLI RTT unit 950 may be configured to perform one or more functions, as discussed further herein, for causing one or more UEs to report signaling time differences and/or for reporting one or more signaling time differences and/or for determining position information (e.g., a position estimate) from signaling time differences.

Figure 10:
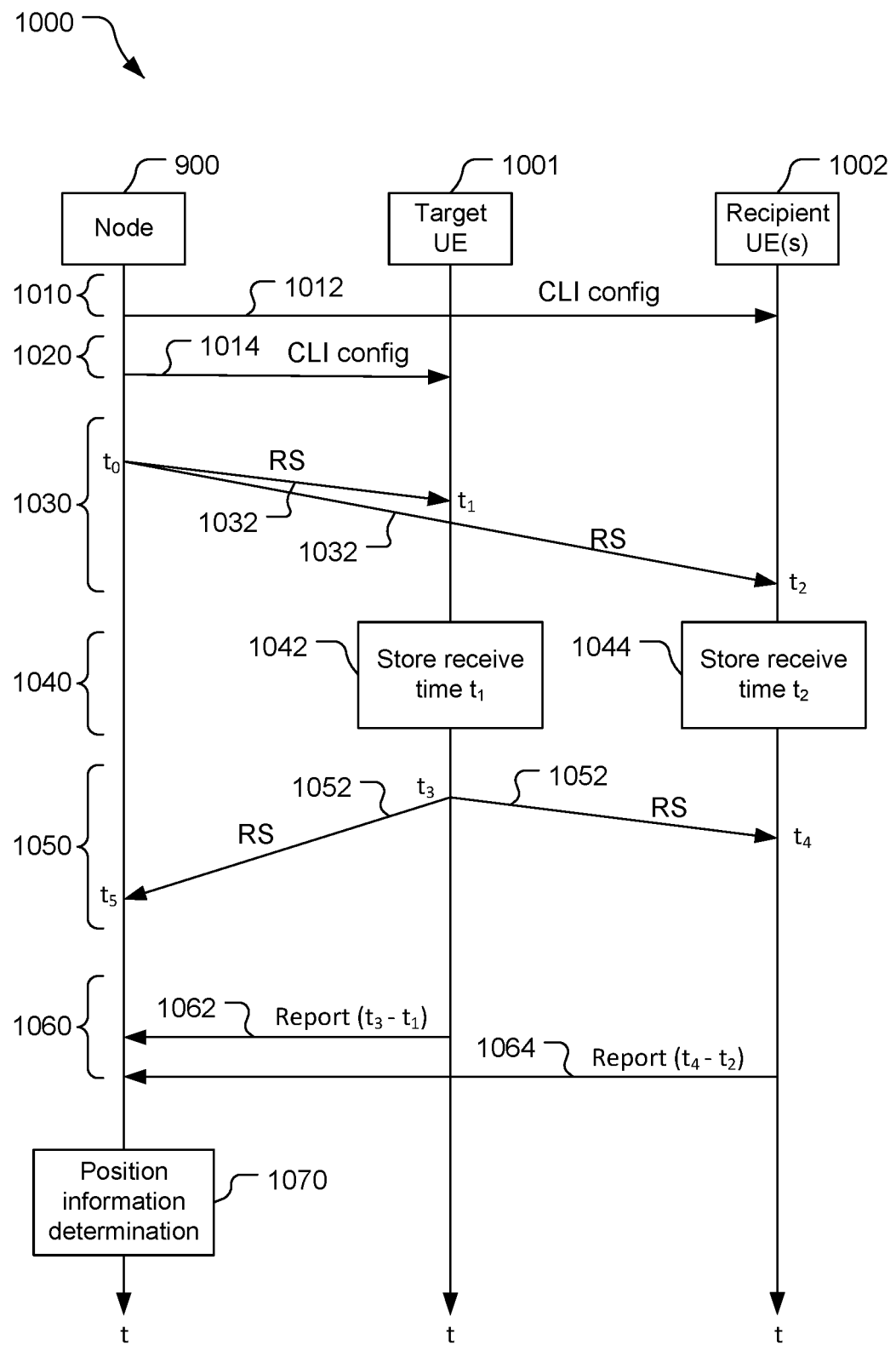
FIG. 10 is a simplified example processing and signal flow for determining position information.

Referring also to FIG. 10, a processing and signal flow 1000 for determining position information includes the stages shown. The flow 1000 is an example, and stages may be added to, removed from, and/or rearranged in the flow 1000. In FIG. 10, some communications are shown with horizontal lines while other communications are shown with angles lines to indicate propagation time. The horizontal lines do not indicate that the propagation time of the respective communication is zero, but are used because the propagation times corresponding to the horizontal lines are irrelevant.

At stage 1010, a CLI configuration is sent from the node 900 to a recipient UE 1002 in a CLI configuration message 1012. The CLI configuration message 1012 may be sent to more than one recipient UE, and may be sent using RRC (Radio Resource Control) signaling. The recipient UE 1002 is an example of the UE 800. The CLI RTT unit 950 may produce and send the CLI configuration message 1012. The CLI configuration message 1012 may include a CLI resource configuration that includes parameters regarding an uplink signal to be sent by a target UE 1001 (which is also an example of the UE 800) that the recipient UE 1002 may use in order to receive, and possibly measure, the uplink signal sent by the target UE 1001. The one or more parameters may also include one or more parameters configured to cause the recipient UE 1002, e.g., the CLI signal unit 850, to report a recipient-UE time difference equal to an amount of time between receipt of the signal sent by the target UE 1001 and receipt of a reference signal sent by the node 900. For example, the one or more parameters may indicate that the CLI resource is a CLI resource for positioning. The one or more parameters may cause the recipient UE 1002 to store a time of receipt of the signal sent by the node 900 and to store a time of receipt of the signal sent by the target UE 1001 in order to determine and report the recipient-UE time difference. Also or alternatively, the CLI configuration message 1012 may be configured to cause the recipient UE 1002 to enter into a CLI positioning mode of operation. While in the CLI positioning mode, the recipient UE 1002 will respond to receiving a CLI resource (a resource of a signal overlapping in time with a downlink signal to the recipient UE 1002, and thus possibly inducing CLI) by determining and reporting the recipient-UE time difference. The CLI configuration message 1012 may thus dynamically configure the recipient UE 1002 to receive the CLI resource (and possibly measure the CLI resource, and store a time of receipt of the CLI resource as appropriate) and to report the recipient-UE time difference.

At stage 1020, the node 900 may send a CLI configuration message 1014 to the target UE 1001. The CLI configuration message 1014 may be the same as (or at least include the configuration content of) the CLI configuration message 1012, and the target UE 1001 (e.g., the CLI signal unit 850) may be configured to respond to the CLI configuration message 1014 indicating for the recipient UE 1002 to report the recipient-UE time difference by reporting a target-UE time difference, storing one or more signal times as appropriate. The target-UE time difference is an amount of time between receipt of the reference signal from the node 900 and transmission of the CLI resource. Also or alternatively, the CLI configuration message 1014 may be configured to cause the target UE 1001 to enter into a CLI positioning mode of operation. While in the CLI positioning mode, the target UE 1001 will respond to transmitting the CLI resource by determining and reporting the target-UE time difference. The CLI configuration message 1014 may thus dynamically configure the target UE 1001 to report the target-UE time difference. Also or alternatively, the CLI configuration message 1014 may include a specific instruction for the target UE 1001 to report the target-UE time difference. This instruction implicitly instructs the target UE 1001 to store the time of receipt of a reference signal from the node 900. The CLI configuration message 1014 may comprise RRC signaling, DCI (Downlink Control Information) signaling, or MAC-CE (Medium Access Control-Control Element) signaling. The CLI configuration message 1014, in any form, may cause (implicitly or possibly explicitly) the target UE 1001 to record (store) a time of receipt of the reference signal from the node 900 and/or a time of transmission of the CLI resource in order to report the target-UE time difference.

At stage 1030, the node 900 sends a reference signal (RS) 1032 to both the target UE 1001 and the recipient UE 1002.

The node 900, e.g., the CLI RTT unit 950 may broadcast the RS 1032. The node 900 sends the RS 1032 at a time to, and the RS 1032 is received by the target UE 1001 at a time $t_1$ and is received by the recipient UE 1002 at a time $t_2$. Although the time $t_2$ is shown as being after the time $t_1$ in FIG. 10, the recipient UE 1002 may receive the RS 1032 before the target UE 1001 receives the RS 1032 (i.e., the time $t_2$ may be before the time $t_1$). The RS 1032 may be a DL-RS or even an SL-RS, e.g., if the node 900 is a UE.

At stage 1040, the target UE 1001 stores the receive time $t_1$ and the recipient UE 1002 stores the receive time $t_2$. At sub-stage 1042, the target UE 1001, e.g., the CLI signal unit 850 of the target UE 1001, stores the time $t_1$ corresponding to when the target UE 1001 received the RS 1032 based on the configuration of the target UE 1001 in response to the CLI configuration message 1014. For example, the CLI signal unit 850 may store the time $t_1$ in response to being provided with the CLI configuration content of the CLI configuration message 1012, or in response to being in the CLI positioning mode of operation and receiving the RS 1032, or in response to being instructed by the CLI configuration message 1014 to report the target-UE time difference. At sub-stage 1044, the recipient UE 1002, e.g., the CLI signal unit 850 of the recipient UE 1002, stores the time $t_2$ corresponding to when the recipient UE 1002 received the RS 1032 based on the configuration of the recipient UE 1002 in response to the CLI configuration message 1012. For example, the CLI signal unit 850 may store the time $t_2$ in response to being provided with the CLI resource configuration content of the CLI configuration message 1012 and receiving the RS 1032, or in response to being in the CLI positioning mode of operation and receiving the RS 1032.

At stage 1050, the target UE 1001 transmits a reference signal at a time $t_3$. The CLI signal unit 850 may cause the interface 820 to send a reference signal 1052, e.g., an SRS or other RS. The RS 1052 is received by the recipient UE 1002 at a time $t_4$ and is received by the node 900 at a time $t_5$. Although the time $t_5$ is shown as being after the time $t_4$, the time $t_4$ may be before the time $t_5$, i.e., the recipient UE 1002 may receive the RS 1052 after the node 900 receives the RS 1052. The recipient UE 1002 may measure the RS 1032 at stage 1030 and/or the RS (e.g., SRS) 1052 at stage 1050, similar to legacy CLI measurement. The recipient UE 1002 may receive the RS 1032, 1052 without transmitting an RS from the recipient UE 1002, which may save power for the recipient UE compared to legacy CLI measurement procedure.

At stage 1060, the target UE 1001 sends a report 1062 to the node 900 indicating the target-UE time difference and the recipient UE 1002 sends a report 1064 to the node 900 indicating the recipient-UE time difference. The target UE 1001, e.g., the CLI signal unit 850 of the target UE 1001, determines the difference in time between receiving the RS 1032 from the node 900 and transmitting the RS 1052, here $t_3-t_1$, and reports this as the target-UE time difference to the node 900 in the report 1062. Similarly, the recipient UE 1002, e.g., the CLI signal unit 850 of the recipient UE 1002, determines the difference in time between receiving the RS 1032 from the node 900 and receiving the RS 1052 from the target UE 1001, here $t_4-t_2$, and reports this as the recipient-UE time difference to the node 900 in the report 1064.

At stage 1070, the node 900 determines position information for the target UE 1001. For example, the node 900, e.g., the CLI RTT unit 950, may be configured to determine one or more measurements, one or more ranges, and/or one or more position estimates for the target UE 1001. The node 900 may be configured, for example, to use ranges between the target UE 1001 and multiple recipient UEs 1002 and locations of the recipient UEs 1002 to determine a position estimate for the target UE 1001, e.g., using trilateration. A differential distance $\Delta d$ may be given as:

$$\Delta d = (\Delta t_{rec} - \Delta t_{target}) \cdot c = d_{n,rec} + d_{target,rec} - 2d_{node,target} \quad (1)$$

where $\Delta t_{rec}$ is the recipient-UE time difference $(t_3-t_1)$, $\Delta t_{target}$ is the target-UE time difference $(t_4-t_2)$, c is the speed of light, $d_{n,rec}$ is the distance between the node 900 and the recipient UE 1002, $d_{target,rec}$ is the distance between the target UE 1001 and the recipient UE 1002, and $d_{node,target}$ is the distance between the node 900 and the target UE 1001. Rearranging Equation (1), the distance $d_{target,rec}$ between the target UE 1001 and the recipient UE 1002 is given by:

$$d_{target,rec} = (\Delta t_{rec} - \Delta t_{target}) \cdot c - d_{n,rec} + 2d_{node,target} \quad (2)$$

The distance $d_{node,target}$ between the node 900 and the target UE 1001 may be determined by the node 900 based on an RTT estimation between the node 900 and the target UE 1001. The RTT estimation may be determined from a difference in time between transmission of the RS 1032 at time to and reception at a time is by the node 900 of the RS 1052 from the target UE 1001, minus the target-UE time difference. That is, the RTT estimation is equal to $(t_5-t_0)-(t_3-t_1)$. The distance $d_{n,rec}$ between the node 900 and the recipient UE 1002 is known (e.g., due to known positions of the node 900 and the recipient UE 1002 (e.g., from SPS-based positions or from RAT-based positions), or from RAT-based measurements (e.g., RTT, RSRP, RSSI, etc.)). The distance $d_{target,rec}$ between the target UE 1001 and the recipient UE 1002 for each of multiple recipient UEs 1002 may be determined, and these distances (ranges) and the known locations of the recipient UEs 1002 used to determine the location of the target UE 1001 using trilateration.

Figure 11:
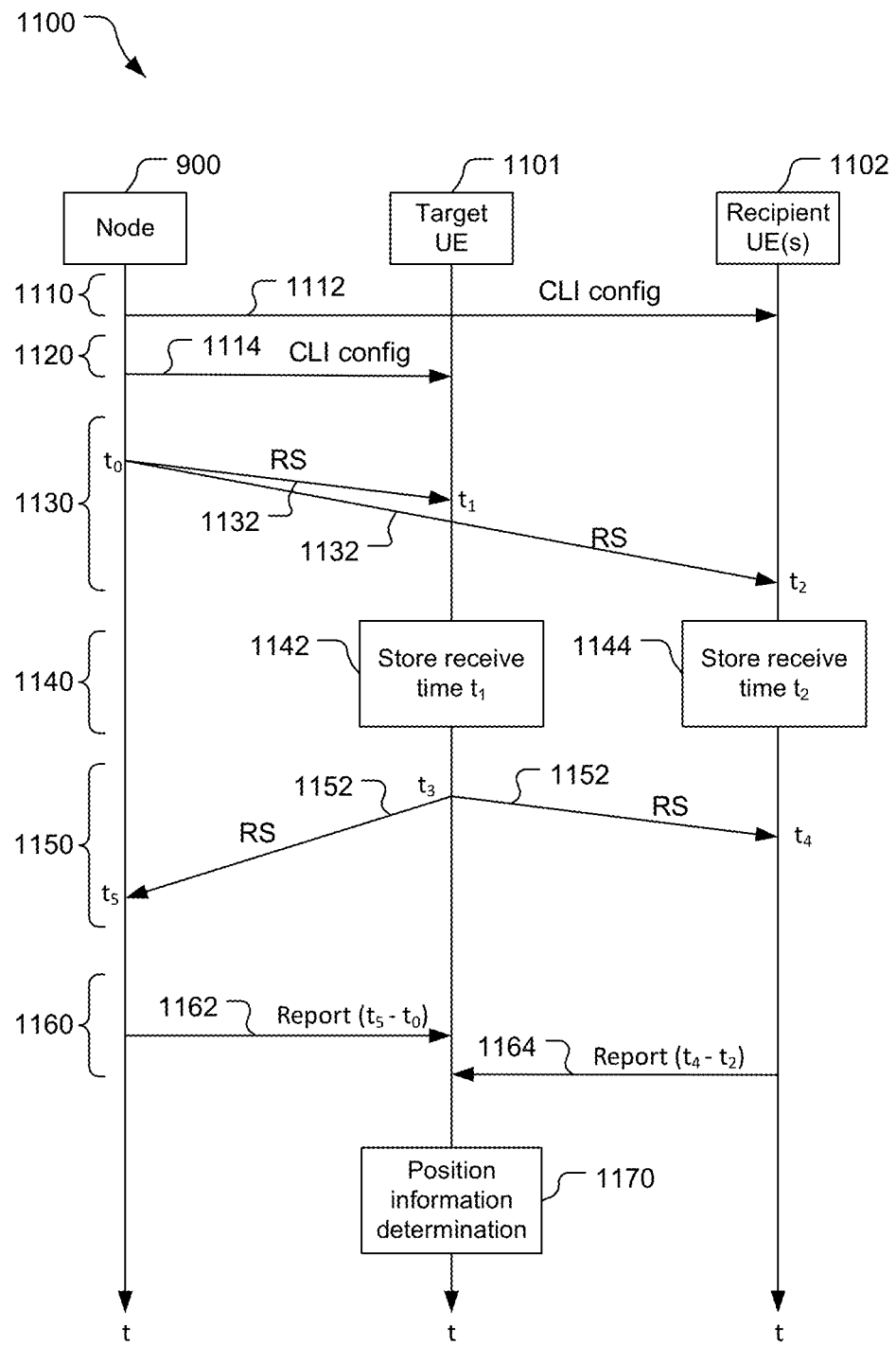
FIG. 11 is a simplified example processing and signal flow for determining position information.

Referring also to FIG. 11, a processing and signal flow 1100 for determining position information includes the stages shown. The flow 1100 is an example, and stages may be added to, removed from, and/or rearranged in the flow 1100. The flow 1100 is similar to the flow 1000, but in the flow 1100 the target UE 1001 collects the time differences and determines the position information for a target UE 1001. In the flow 1100, a CLI configuration message 1112 sent at stage 1110 may be configured to cause a recipient UE 1102 to report the recipient-UE time difference to the target UE 1101 instead of or in addition to the node 900. A CLI configuration message 1114 sent at stage 1120 may cause the target UE 1101 to collect time differences for position determination. Stages 1130, 1140 may be similar to stage 1030, 1040, with the node 900 sending an RS 1132, the target UE 1101 stored the receive time $t_1$ at sub-stage 1142, and the recipient UE storing the receive time $t_2$ at sub-stage 1144. Stage 1150 is similar to stage 1050, with the target UE 1101 transmitting an RS 1152 that is received by the node 900 and the recipient UE 1102. At stage 1160, the node 900 sends a report 1162 with a node time difference $(t_5-t_0)$ that is an amount of time between transmission of the RS 1132 from the node 900 and reception of the RS 1152 from the target UE 1101, which the target UE 1101 may use to determine the distance $d_{node,target}$ between the node 900 and the target UE 1101. Also at stage 1160, the recipient UE 1102 sends a report 1164 with the recipient-UE time difference. At stage 1170, the target UE 1101 may determine the position information for the target UE 1101 using Equation (2).

Lower latency may be achieved using the flow 1000 or the flow 1100 compared to legacy techniques in which a UE measures RS (e.g., PRS) from multiple nodes (e.g., gNBs) in order to obtain sufficient measurements for positioning. In the flows 1000, 1100, the target UE 1001, 1101 may receive RS from fewer nodes than in legacy techniques, e.g., may receive RS from as few as a single node, the node 900.

In either the flow 1000 or the flow 1100, the node 900 may send the RS 1032, 1132 in response to, and thus after, receipt of the RS 1052, 1152 from the target UE 1001, 1101. In such cases, the flows 1000, 1100 may be modified to have the node 900 report a time difference $t_0$–$t_5$ to the target UE 1001, and to have the recipient UE 1002 report a time difference $t_2$–$t_4$ to the target UE 1001. The flow 1000 may be further modified to have the target UE 1001 report a time difference $t_1$–$t_3$ to the node 900. The flow 1100 may be further modified to have the target UE 1001 use the time difference $t_0$–$t_5$ and a time difference $t_1$–$t_3$ to determine a distance between the node 900 and the target UE 1001.

Operation

Figure 12:
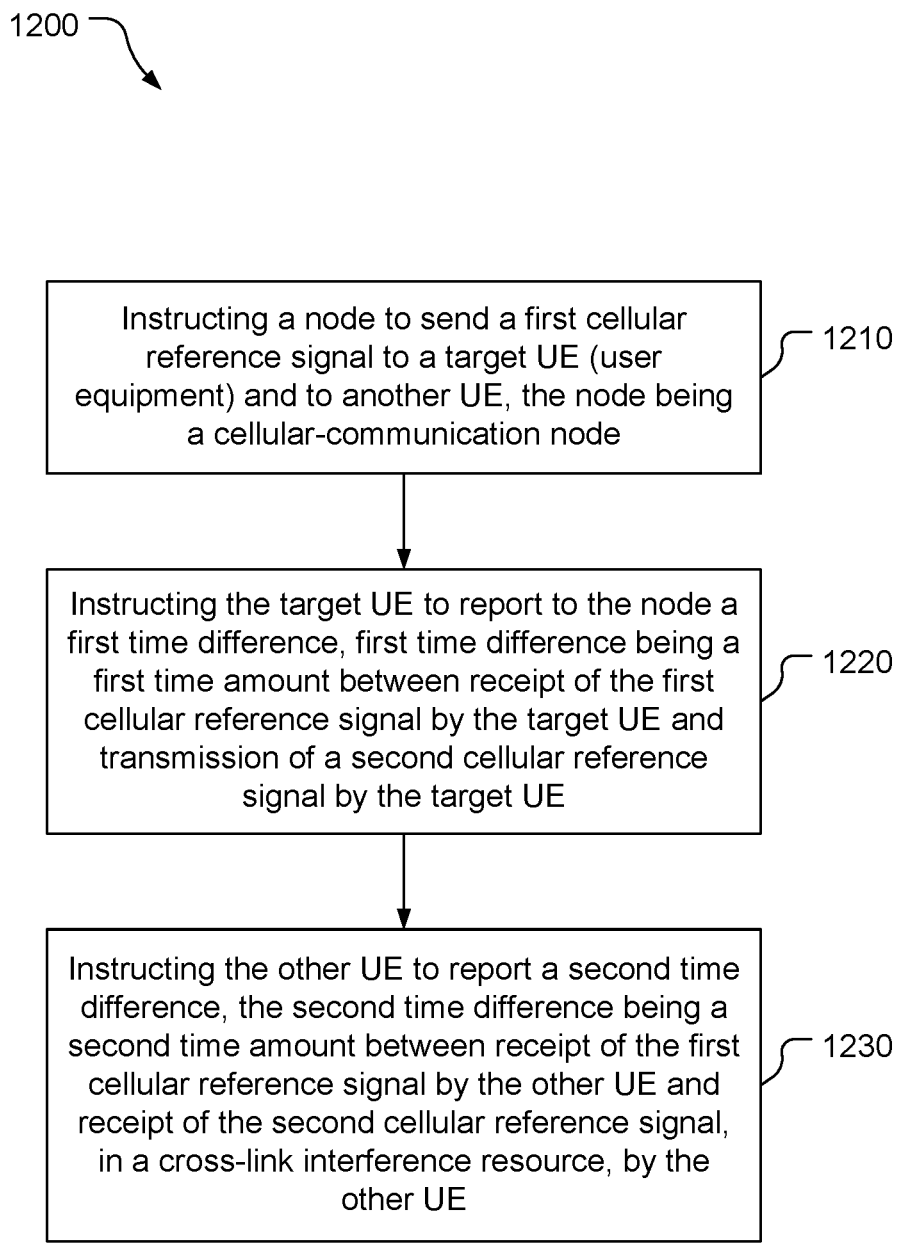
FIG. 12 is a block flow diagram of a method of facilitating position information determination.

Referring to FIG. 12, with further reference to FIGS. 1-11, a method 1200 of facilitating position information determination includes the stages shown. The method 1200 is, however, an example only and not limiting. The method 1200 may be altered, e.g., by having stages added, removed, rearranged, combined, performed concurrently, and/or having single stages split into multiple stages.

At stage 1210, the method 1200 includes instructing a node to send a first cellular reference signal to a target UE (user equipment) and to another UE, the node being a cellular-communication node. For example, the node 900 (e.g., the CLI RTT unit 950) may instruct the node 900 to send the RS 1032, 1132 to the target UE 1001, 1101 and the recipient UE 1002, 1102, e.g., by broadcasting the RS 1032, 1132. For example, the server 400 may instruct the TRP 300 (or a UE) to send the RS 1032, 1132 (e.g., by instructing the TRP 300 generally to send RS and the TRP 300 determining/scheduling to send the RS 1032, 1132 specifically). As another example, the node 900 may be the TRP 300 (or a UE) and the CLI RTT unit 950 may instruct another portion of the node 900, e.g., the interface 920, to send the first cellular reference signal. The processor 910, possibly in combination with the memory 930, possibly in combination with the interface 920 (e.g., the transceiver 315, 415) may comprise means for instructing the node to send the first cellular reference signal.

At stage 1220, the method 1200 includes instructing the target UE to report to the node a first time difference, first time difference being a first time amount between receipt of the first cellular reference signal by the target UE and transmission of a second cellular reference signal by the target UE. For example, the node 900 may instruct the node 900 to send the CLI configuration message 1014, 1114 to the target UE 1001, 1101. For example, the server 400 may instruct the TRP 300 (or a UE) to send the CLI configuration message 1014, 1114, or may instruct the TRP 300 (or a UE) to schedule RS in response to which the TRP 300 (or UE) schedules a CLI resource for positioning and sends the CLI configuration message 1014, 1114 to the target UE 1001, 1101. The configuration message 1014, 1114 may instruct, directly or indirectly (e.g., by putting the target UE 1001, 1101 in CLI positioning mode or providing the target UE 1001, 1101 with configuration information for the recipient UE 1002, 1102 to report timing information), the target UE 1001, 1101 to report the first time difference (the target-UE time difference), e.g., to the node 900 or to the target UE 1001, 1101 (e.g., to the memory 830 of the target UE 1001, 1101). The processor 910, possibly in combination with the memory 930, possibly in combination with the interface 920 (e.g., the transceiver 315, 415) may comprise means for instructing the node to send the first cellular reference signal.

At stage 1230, the method 1200 includes instructing the other UE to report a second time difference, the second time difference being a second time amount between receipt of the first cellular reference signal by the other UE and receipt of the second cellular reference signal, in a cross-link interference resource, by the other UE. For example, the node 900 may instruct the node 900 to send the CLI configuration message 1012, 1112 to the recipient UE 1002, 1102. For example, the server 400 may instruct the TRP 300 to send the CLI configuration message 1012, 1112, or may instruct the TRP 300 to schedule RS in response to which the TRP 300 schedules a CLI resource for positioning and sends the CLI configuration message 1012, 1112 to the recipient UE 1002, 1102. The configuration message 1012, 1112 may instruct, directly or indirectly (e.g., by putting the recipient UE 1002, 1102 in CLI positioning mode), the recipient UE 1002, 1102 to report the first time difference (the recipient-UE time difference), e.g., to the node 900 or to the target UE 1001, 1101. The processor 910, possibly in combination with the memory 930, possibly in combination with the interface 920 (e.g., the transceiver 315, 415) may comprise means for instructing the node to send the first cellular reference signal.

Implementations of the method 1200 may include one or more of the following features. In an example implementation, instructing the other UE to report the second time difference includes instructing the node to send a cross-link interference resource configuration, including an instruction to report the second time difference, to the other UE. For example, the CLI configuration message 1012, 1112 may, for example, include an explicit instruction for the recipient UE 1002, 1102 to report the recipient-UE time difference. As another example, the CLI configuration message 1012, 1112 may include an explicit instruction for the recipient UE 1002, 1102 to report the recipient-UE time difference, e.g., an instruction to enter the CLI operating mode in which the recipient UE 1002, 1102 will report the recipient-UE time difference in response to receiving the RS 1032, 1132 and the RS 1052, 1152. In another example implementation, instructing the target UE to report the first time difference includes instructing the node to send the cross-link interference resource configuration to the target UE. For example, the CLI configuration message 1014, 1114 may include the configuration of the CLI resource provided to the recipient UE 1002, 1102, and this implicitly instructs the target UE 1001, 1101 to report the target-UE time difference (the target UE 1001, 1101 responds to this content by collecting information for, and reporting, the target-UE time difference).

Also or alternatively, implementations of the method 1200 may include one or more of the following features. In an example implementation, instructing the target UE to report the first time difference includes instructing the node to send a reporting instruction to the target UE for the target UE to report the first time difference. For example, the node 900 (e.g., the server 400 or the TRP 300) may instruct the TRP 300 to include in the CLI configuration message 1014, 1114 a reporting instruction explicitly instructing the target UE 1001, 1101 to report the target-UE time difference and/or implicitly instructing the target UE 1001, 1101 to report the target-UE time difference (e.g., by instructing the target UE to enter the CLI positioning mode). The reporting instruction may part of at least one of a downlink control information (DCI) signal, a medium access control-control element (MAC-CE) signal, or a radio resource control (RRC) signal.

Also or alternatively, implementations of the method 1200 may include one or more of the following features. In an example implementation, the first cellular reference signal comprises one of a downlink reference signal (DL-RS) (e.g., if the node includes the TRP 300) or a sidelink reference signal (SL-RS, e.g., SL CSI-RS) (e.g., if the node includes the UE 800). In another example implementation, the method 1200 includes instructing the target UE to send the second cellular reference signal overlapping in time with the first cellular reference signal. For example, the TRP 300 may schedule the target UE 1001, 1101 to send a CLI resource for positioning (a reference signal for positioning that overlaps in time with a downlink signal to a recipient UE). The processor 910, possibly in combination with the memory 930, possibly in combination with the interface 920 (e.g., the transceiver 315, 415) may comprise means for instructing the target UE to send the second cellular reference signal overlapping in time with the first cellular reference signal.

Also or alternatively, implementations of the method 1200 may include one or more of the following features. In an example implementation, the method 1200 may include determining a first distance between the node and the target UE based on a transmission time of first cellular reference signal from the node, a first reception time at the node of the second cellular reference signal, and the first time difference; determining a second distance between the node and the other UE; determining a third distance between the other UE and the target UE based on the first time difference, the second time difference, the second distance between the node and the other UE, and the first distance between the node and the target UE; and determining a first location of the target UE based on the third distance between the other UE and the target UE and a second location of the other UE. For example, the node 900 (e.g., the CLI RTT unit 950) may determine the location of the target UE 1001, 1101 using Equation (2). The node 900 (or the target UE 1001, 1101) may use the distance to each of multiple recipient UEs 1002, 1102 to determine the location of the target UE 1001, 1101. The processor 910, possibly in combination with the memory 930 (or the processor 810, possibly in combination with the memory 830) may comprise means for determining the first distance, means for determining the second distance, means for determining the third distance, and means for determining the first location of the target UE.

Figure 13:
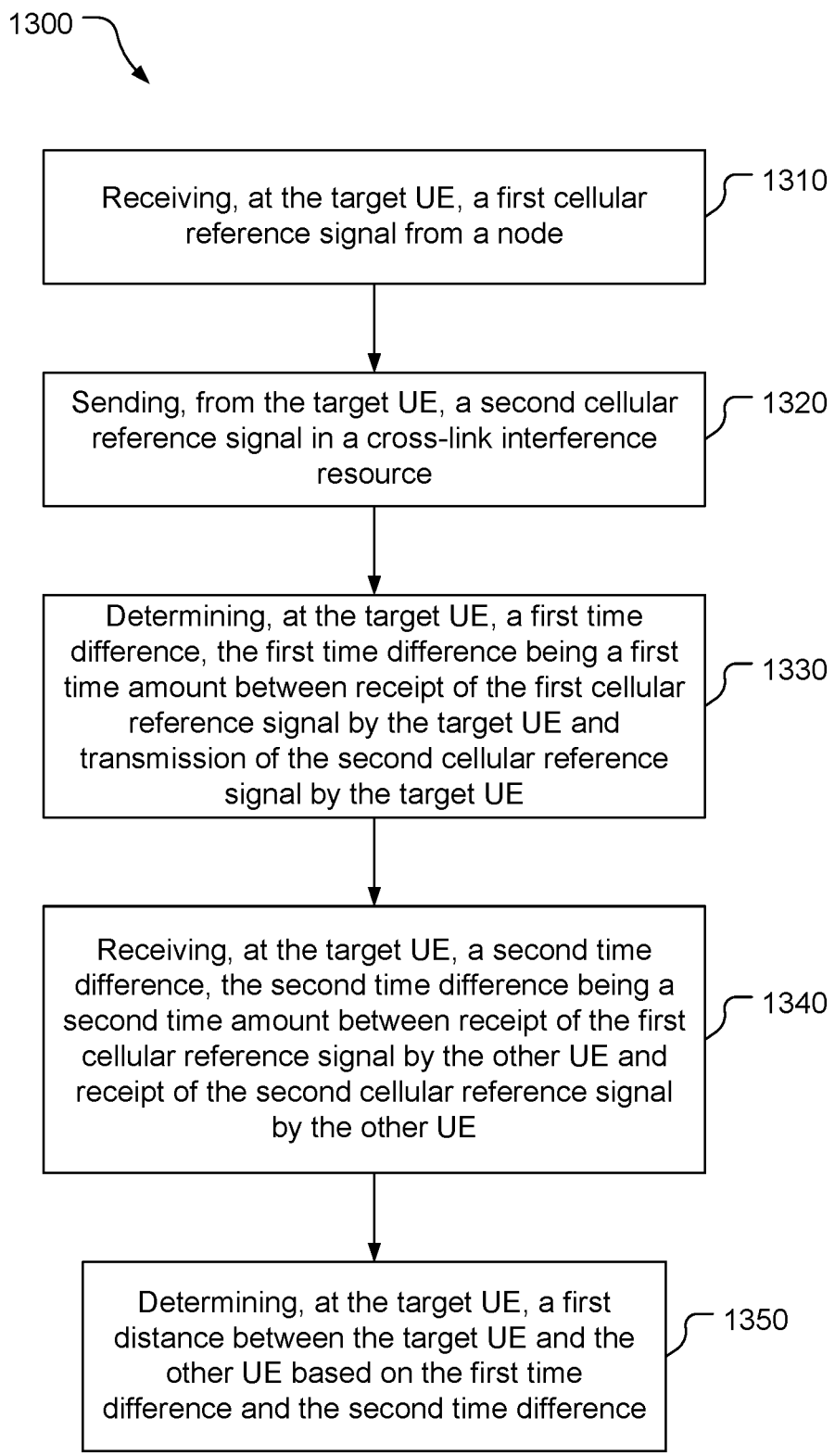
FIG. 13 is a block flow diagram of a method of facilitating determination of a location of a target UE.

Referring to FIG. 13, with further reference to FIGS. 1-12, a method 1300 of facilitating determination of a location of a target UE includes the stages shown. The method 1200 is, however, an example only and not limiting. The method 1300 may be altered, e.g., by having stages added, removed, rearranged, combined, performed concurrently, and/or having single stages split into multiple stages.

At stage 1310, the method 1300 includes receiving, at the target UE, a first cellular reference signal from a node. For example, the target UE 1101 receives the RS 1132 from the node 900. The processor 810, possibly in combination with the memory 830, in combination with the interface 820 (e.g., the wireless receiver 244 and the antenna 246) may comprise means for receiving the first cellular reference signal.

At stage 1320, the method 1300 includes sending, from the target UE, a second cellular reference signal in a cross-link interference resource. For example, the target UE 1101 transmits the RS 1152 in a CLI resource. The processor 810, possibly in combination with the memory 830, in combination with the interface 820 (e.g., the wireless transmitter 242 and the antenna 246) may comprise means for sending the second cellular reference signal.

At stage 1330, the method 1300 includes determining, at the target UE, a first time difference, the first time difference being a first time amount between receipt of the first cellular reference signal by the target UE and transmission of the second cellular reference signal by the target UE. For example, the processor 810, e.g., the CLI signal unit 850, of the target UE 1101 determines the target-UE time difference $(t_3-t_1)$. The processor 810, possibly in combination with the memory 830, may comprise means for determining the first time difference.

At stage 1340, the method 1300 includes receiving, at the target UE, a second time difference, the second time difference being a second time amount between receipt of the first cellular reference signal by the other UE and receipt of the second cellular reference signal by the other UE. For example, the target UE 1101 receives the report 1164 from the recipient UE 1102 with the recipient-UE time difference $(t_4-t_2)$. The processor 810, possibly in combination with the memory 830, in combination with the interface 820 (e.g., the wireless receiver 244 and the antenna 246) may comprise means for receiving the second time difference.

At stage 1350, the method 1300 includes determining, at the target UE, a first distance between the target UE and the other UE based on the first time difference and the second time difference. For example, the processor 810 may determine the distance between the target UE 1101 and the recipient UE 1102 using the target-UE time difference and the recipient-UE time difference. The processor 810, possibly in combination with the memory 830, may comprise means for determining the first distance.

Implementations of the method 1300 may include one or more of the following features. In an example implementation, the method 1300 may include: receiving, at the target UE, a third time difference, the third time difference being a third time amount between transmission of the first cellular reference signal by the node and reception of the second cellular reference signal by the node; determining, at the target UE, a first distance between the node and the target UE based on the first time difference and the third time difference; obtaining, at the target UE, a second distance between the node and the other UE; determining, at the target UE, a third distance between the other UE and the target UE based on the first time difference, the second time difference, the second distance between the node and the other UE, and the first distance between the node and the target UE; and determining, at the target UE, a first location of the target UE based on the third distance between the other UE and the target UE and a second location of the other UE. For example, the processor 810 may receive through the interface 820 the node time difference $(t_5-t_0)$, may obtain (e.g., calculate from locations of the node 900 and the recipient UE 1102, or receive from an entity such as the node 900 or the recipient UE 1102) the distance between the node and the recipient UE 1102, may determine the target-UE time difference, may determine the distance between the node 900 and the target UE 1101 (using the node time difference and the target-UE time difference), may determine the distance between the target UE 1101 and the recipient UE 1102 using Equation (2), and may determine the location of the target UE 1101 using the distance between the target UE 1101 and the recipient UE 1102 and the location of the recipient UE 1102. The processor 810 may determine the location of the target UE 1101 determining the distances between the target UE 1101 and multiple recipient UEs 1102 and using the distances between the target UE 1101 and the recipient UEs 1102 and the locations of the recipient UEs 1102. The processor 810, possibly in combination with the memory 830, in combination with the interface 820 (e.g., the wireless receiver 244 and the antenna 246) may comprise means for receiving the third time difference. The processor 810, possibly in combination with the memory 830, and possibly in combination with the interface 820 (e.g., the wireless receiver 244 and the antenna 246) may comprise means for obtaining the second distance. The processor 810, possibly in combination with the memory 830, may comprise means for determining the first distance, means for determining the third distance, and means for determining the first location. In another example implementation, the method 1300 includes determining, at the target UE, the second distance based on the location of the other UE. For example, the processor 810 may calculate the second distance based on a location of the node 900 and a location of the recipient UE 1102 (that the target UE 1101 may receive). The processor 810, possibly in combination with the memory 830, and possibly in combination with the interface 820 (e.g., the wireless receiver 244 and the antenna 246) may comprise means for determining the second distance. In an example implementation, the second cellular reference signal may comprise a sidelink reference signal (SL-RS such as SL CSI-RS).

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
    an interface;
    a memory; and
    a processor, communicatively coupled to the interface and the memory, configured to:
        instruct a node to send a first cellular reference signal to a target UE (user equipment) and to another UE, the node being a cellular-communication node;
        instruct, via the interface, the target UE to report to the node a first time difference, the first time difference being a first time amount between receipt of the first cellular reference signal by the target UE and transmission of a second cellular reference signal by the target UE; and
        instruct, via the interface, the other UE to report a second time difference, the second time difference being a second time amount between receipt of the first cellular reference signal by the other UE and receipt of the second cellular reference signal, in a cross-link interference resource, by the other UE.

2. The apparatus of claim 1, wherein to instruct the other UE to report the second time difference, the processor is configured to instruct the node to send a cross-link interference resource configuration, including an instruction to report the second time difference, to the other UE.

3. The apparatus of claim 2, wherein to instruct the target UE to report the first time difference, the processor is configured to instruct the node to send the cross-link interference resource configuration to the target UE.

4. The apparatus of claim 1, wherein to instruct the target UE to report the first time difference, the processor is configured to instruct the node to send a reporting instruction to the target UE for the target UE to report the first time difference.

5. The apparatus of claim 4, wherein the reporting instruction is part of at least one of a downlink control information (DCI) signal, a medium access control-control element (MAC-CE) signal, or a radio resource control (RRC) signal.

6. The apparatus of claim 1, wherein the first cellular reference signal comprises one of a downlink reference signal (DL-RS) or a sidelink reference signal (SL-RS).

7. The apparatus of claim 1, wherein the processor is configured to instruct, using the interface, the target UE to send the second cellular reference signal overlapping in time with the first cellular reference signal.

8. The apparatus of claim 1, wherein the apparatus includes the node.

9. The apparatus of claim 8, wherein the processor is configured to:
    send the first cellular reference signal via the interface;
    receive the second cellular reference signal via the interface;
    determine a first distance between the node and the target UE based on a transmission time of first cellular reference signal from the node, a first reception time at the node of the second cellular reference signal, and the first time difference;
    determine a second distance between the node and the other UE;
    determine a third distance between the other UE and the target UE based on the first time difference, the second time difference, the second distance between the node and the other UE, and the first distance between the node and the target UE; and
    determine a first location of the target UE based on the third distance between the other UE and the target UE and a second location of the other UE.

10. An apparatus comprising:
    means for instructing a node to send a first cellular reference signal to a target UE (user equipment) and to another UE, the node being a cellular-communication node;
    means for instructing the target UE to report to the node a first time difference, the first time difference being a first time amount between receipt of the first cellular reference signal by the target UE and transmission of a second cellular reference signal by the target UE; and
    means for instructing the other UE to report a second time difference, the second time difference being a second time amount between receipt of the first cellular reference signal by the other UE and receipt of the second cellular reference signal, in a cross-link interference resource, by the other UE.

11. A method of facilitating position information determination, the method comprising:
    instructing a node to send a first cellular reference signal to a target UE (user equipment) and to another UE, the node being a cellular-communication node;
    instructing the target UE to report to the node a first time difference, the first time difference being a first time amount between receipt of the first cellular reference signal by the target UE and transmission of a second cellular reference signal by the target UE; and instructing the other UE to report a second time difference, the second time difference being a second time amount between receipt of the first cellular reference signal by the other UE and receipt of the second cellular reference signal, in a cross-link interference resource, by the other UE.

12. The method of claim 11, wherein instructing the other UE to report the second time difference includes instructing the node to send a cross-link interference resource configuration, including an instruction to report the second time difference, to the other UE.

13. The method of claim 12, wherein instructing the target UE to report the first time difference includes instructing the node to send the cross-link interference resource configuration to the target UE.

14. The method of claim 11, wherein instructing the target UE to report the first time difference includes instructing the node to send a reporting instruction to the target UE for the target UE to report the first time difference.

15. The method of claim 14, wherein the reporting instruction is part of at least one of a downlink control information (DCI) signal, a medium access control-control element (MAC-CE) signal, or a radio resource control (RRC) signal.

16. The method of claim 11, wherein the first cellular reference signal comprises one of a downlink reference signal (DL-RS) or a sidelink reference signal (SL-RS).

17. The method of claim 11, further comprising instructing the target UE to send the second cellular reference signal overlapping in time with the first cellular reference signal.

18. The method of claim 11, further comprising:
determining a first distance between the node and the target UE based on a transmission time of first cellular reference signal from the node, a first reception time at the node of the second cellular reference signal, and the first time difference;
determining a second distance between the node and the other UE;
determining a third distance between the other UE and the target UE based on the first time difference, the second time difference, the second distance between the node and the other UE, and the first distance between the node and the target UE; and
determining a first location of the target UE based on the third distance between the other UE and the target UE and a second location of the other UE.

19. A target UE (user equipment) comprising:
an interface;
a memory; and
a processor, communicatively coupled to the interface and the memory, configured to:
receive, via the interface, a first cellular reference signal from a node;
send, via the interface, a second cellular reference signal in a cross-link interference resource;
determine a first time difference, the first time difference being a first time amount between receipt of the first cellular reference signal by the target UE and transmission of the second cellular reference signal by the target UE;
receive, via the interface, a second time difference, the second time difference being a second time amount between receipt of the first cellular reference signal by the other UE and receipt of the second cellular reference signal by the other UE; and
determine a first distance between the target UE and the other UE based on the first time difference and the second time difference.

20. The target UE of claim 19, wherein the processor is configured to:
receive, via the interface, a third time difference, the third time difference being a third time amount between transmission of the first cellular reference signal by the node and reception of the second cellular reference signal by the node;
determine a node-target distance between the node and the target UE based on the first time difference and the third time difference;
obtain a second distance between the node and the other UE;
determine a third distance between the other UE and the target UE based on the first time difference, the second time difference, the second distance between the node and the other UE, and the node-target distance between the node and the target UE; and
determine a first location of the target UE based on the third distance between the other UE and the target UE and a second location of the other UE.

21. The target UE of claim 20, wherein the processor is configured to determine the second distance based on the second location of the other UE.

22. The target UE of claim 19, wherein the second cellular reference signal comprises a sidelink reference signal (SL-RS).

23. A target UE (user equipment) comprising:
means for receiving a first cellular reference signal from a node;
means for sending a second cellular reference signal in a cross-link interference resource;
means for determining a first time difference, the first time difference being a first time amount between receipt of the first cellular reference signal by the target UE and transmission of the second cellular reference signal by the target UE;
means for receiving a second time difference, the second time difference being a second time amount between receipt of the first cellular reference signal by the other UE and receipt of the second cellular reference signal by the other UE; and
means for determining a first distance between the target UE and the other UE based on the first time difference and the second time difference.

24. A method of facilitating determination of a location of a target UE (user equipment), the method:
receiving, at the target UE, a first cellular reference signal from a node;
sending, from the target UE, a second cellular reference signal in a cross-link interference resource;
determining, at the target UE, a first time difference, the first time difference being a first time amount between receipt of the first cellular reference signal by the target UE and transmission of the second cellular reference signal by the target UE;
receiving, at the target UE, a second time difference, the second time difference being a second time amount between receipt of the first cellular reference signal by the other UE and receipt of the second cellular reference signal by the other UE; and
determining, at the target UE, a first distance between the target UE and the other UE based on the first time difference and the second time difference.

25. The method of claim 24, further comprising:
receiving, at the target UE, a third time difference, the third time difference being a third time amount between transmission of the first cellular reference signal by the node and reception of the second cellular reference signal by the node;
determining, at the target UE, a node-target distance between the node and the target UE based on the first time difference and the third time difference;
obtaining, at the target UE, a second distance between the node and the other UE;
determining, at the target UE, a third distance between the other UE and the target UE based on the first time difference, the second time difference, the second distance between the node and the other UE, and the node-target distance between the node and the target UE; and
determining, at the target UE, a first location of the target UE based on the third distance between the other UE and the target UE and a second location of the other UE.

26. The method of claim 25, further comprising determining, at the target UE, the second distance based on the second location of the other UE.

27. The method of claim 24, wherein the second cellular reference signal comprises a sidelink reference signal (SL-RS).

\* \* \* \* \*